United States Patent [19]

Ericson

[11] 4,016,697

[45] Apr. 12, 1977

[54] CONSTRUCTION UNIT

[75] Inventor: Richard Ericson, Park Ridge, Ill.

[73] Assignee: United States Gypsum Company, Chicago, Ill.

[22] Filed: Jan. 27, 1975

[21] Appl. No.: 544,638

Related U.S. Application Data

[63] Continuation of Ser. No. 864,625, Oct. 8, 1969, abandoned.

[52] U.S. Cl. .................................. 52/622; 52/336; 52/612

[51] Int. Cl.² ...................... E04C 2/00; E04B 1/16

[58] Field of Search ............. 52/211, 212, 334–336, 52/443, 449, 598, 599, 600, 622, 612

[56] References Cited

UNITED STATES PATENTS

| 775,927 | 11/1904 | Kahn | 52/336 |
|---|---|---|---|
| 1,531,530 | 3/1925 | Walper | 52/612 |
| 1,661,183 | 3/1928 | Junker | 52/599 |
| 1,719,607 | 7/1929 | Harvey | 52/615 |
| 1,934,788 | 11/1933 | Bole | 52/598 |
| 1,947,418 | 2/1934 | Kahn | 52/335 |
| 1,976,947 | 10/1934 | Krauss | 52/443 |
| 2,059,664 | 11/1936 | Tashjian | 52/599 |
| 2,191,461 | 2/1940 | Ford | 52/445 |
| 3,512,327 | 5/1970 | Padura | 52/612 |

*Primary Examiner*—J. Karl Bell
*Attorney, Agent, or Firm*—Samuel Kurlandsky; Donnie Rudd; Kenneth E. Roberts

[57] ABSTRACT

This invention relates to boardlike, load bearing, construction units formed from a tensile portion substantially uniformly distributed over the entire area thereof and which also has fastener holding properties and a cementitious material of good compressional strength forming substantially the remaining portion of the unit with novel means for effecting a bond between the tensile and compressional portions along with means for manufacturing the units and their use in various systems of construction.

9 Claims, 17 Drawing Figures

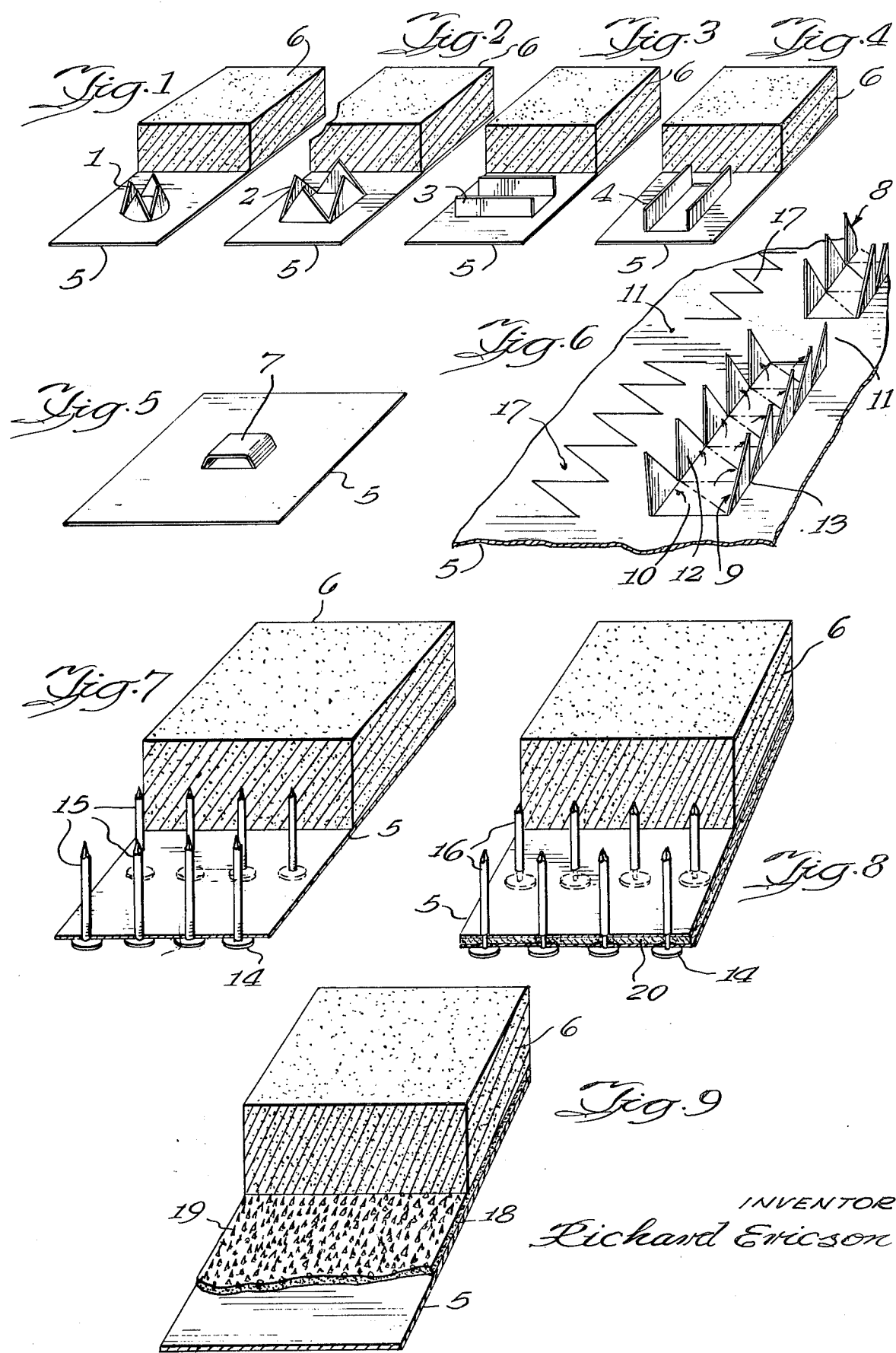

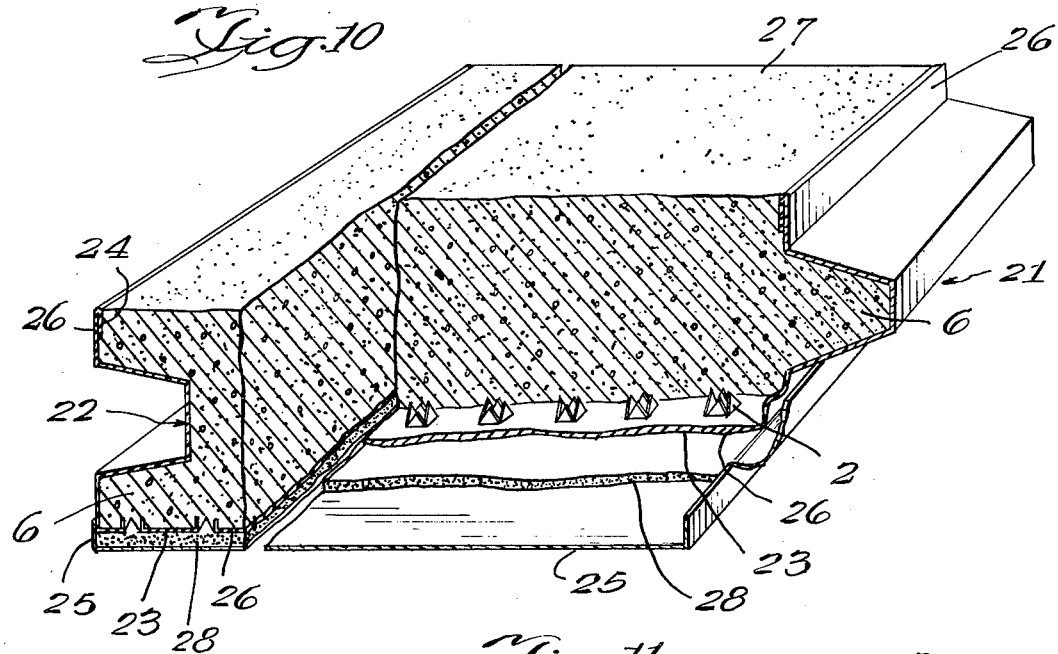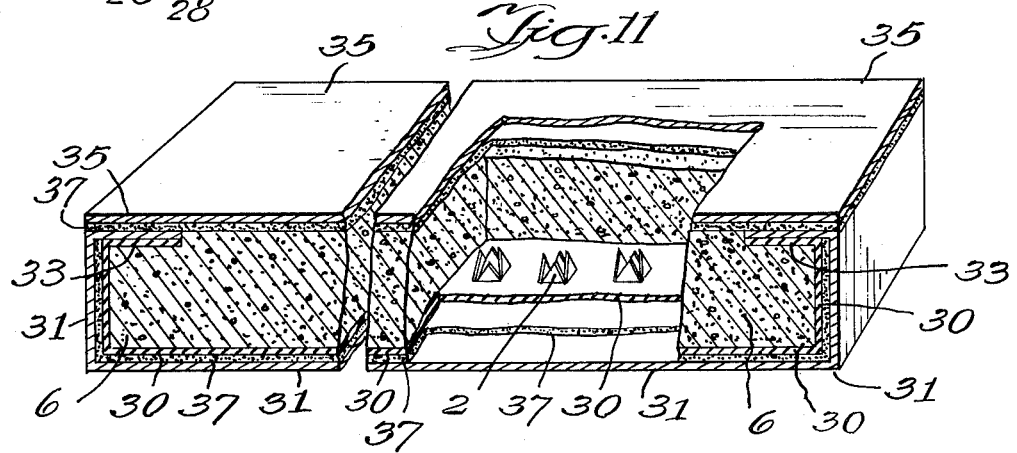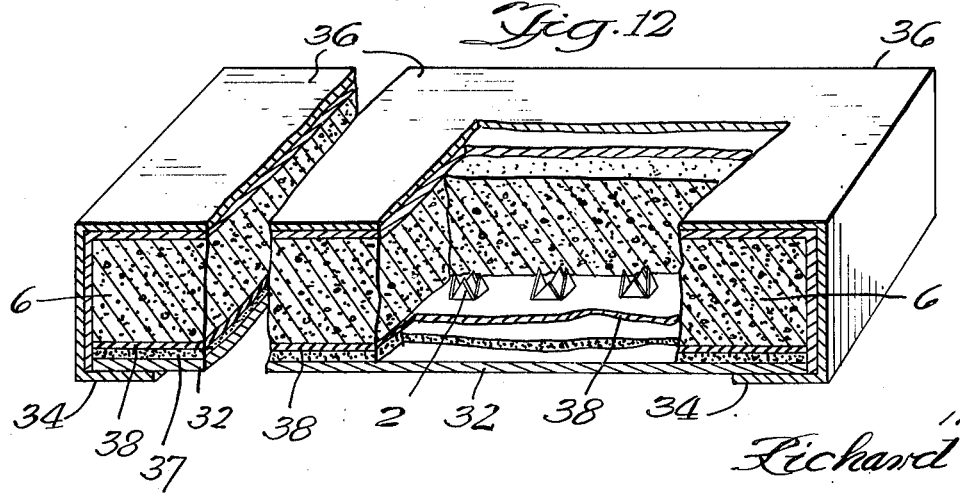

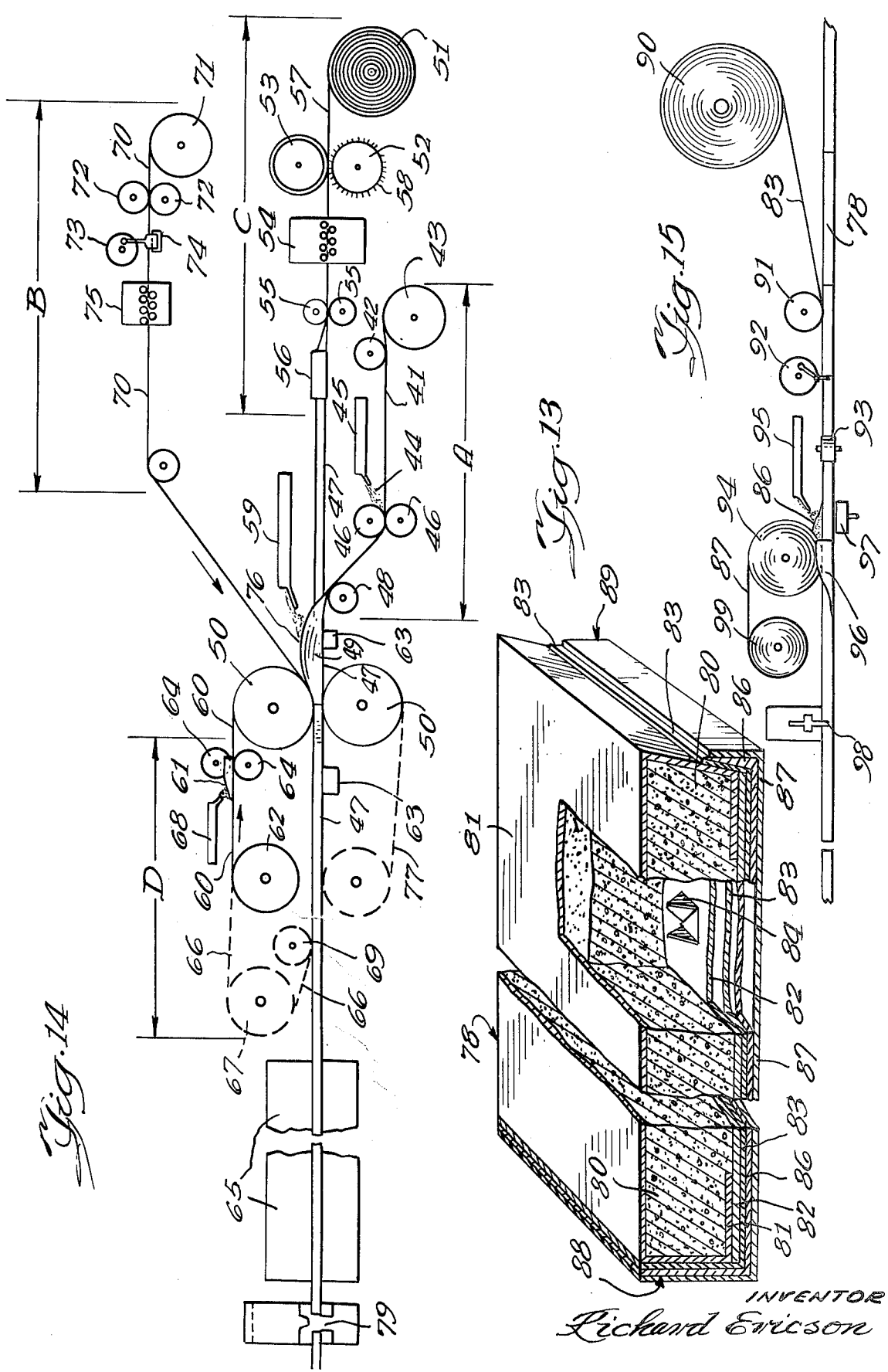

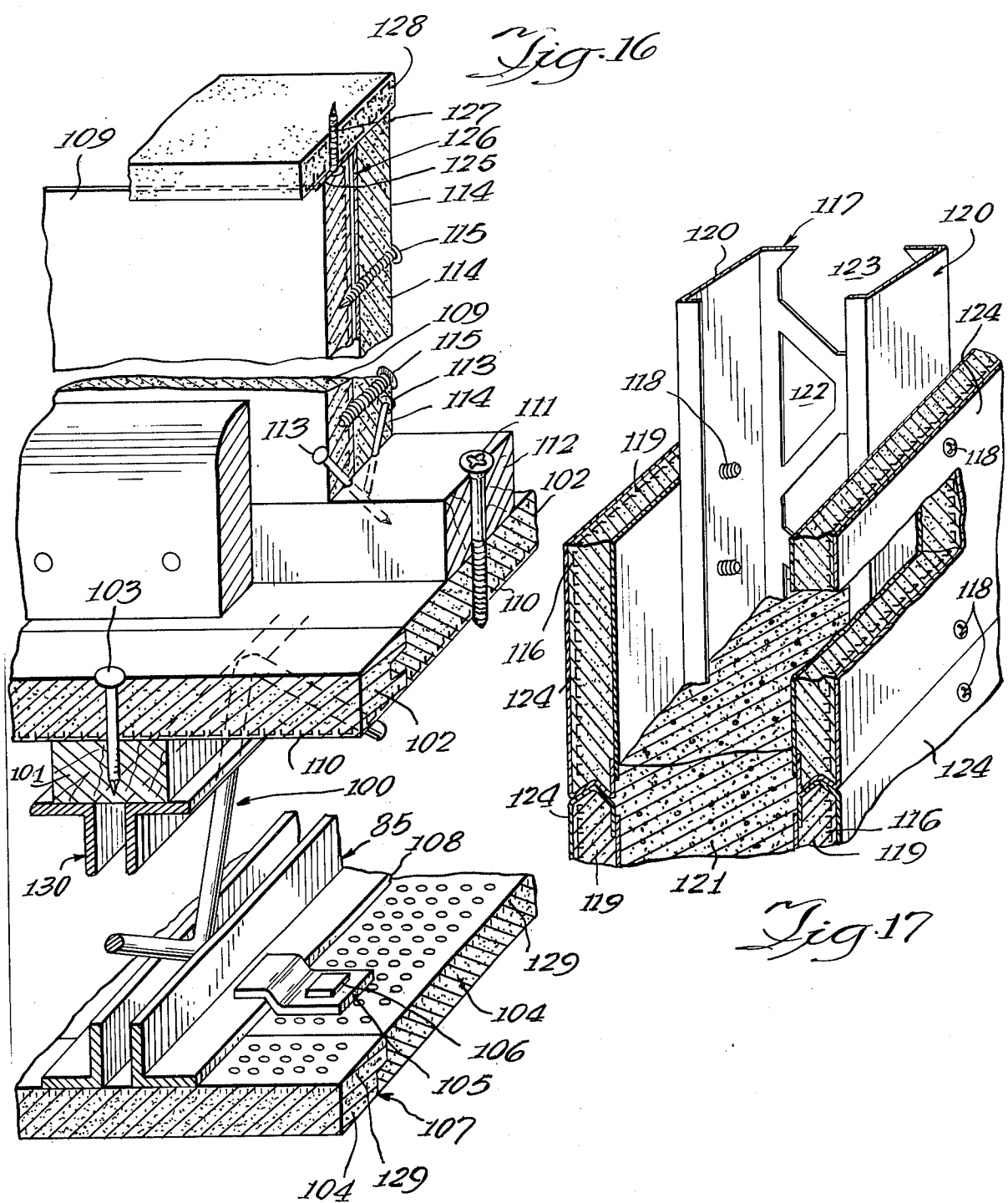

CONSTRUCTION UNIT

This is a continuation of application Ser. No. 864,625, filed Oct. 8, 1969, now abandoned.

From the forthcoming description it is evident that this invention relates to an improved construction unit in board or tile form which is load bearing, incombustible, substantially uniform in structural properties along with good and uniform holding power for fasteners. The units can be economically made in a continuous manner. Methods of manufacturing such units are set-forth along with novel system of construction using a plurality of such units.

At the present time, plywood is the only commerically available boardlike structural material. Plywood has certain disadvantages such as lack of uniformity in strength due to variations in the structure of the wood and its moisture content, combustibility and deterioration under damp conditions by mildew, etc. Cementitious wallboards such as those made from gypsum are unsatisfactory for this purpose as they are made primarily from a core of set calcined gypsum enclosed in paper which have poor tensile strength and hence poor structural strength; also they have poor holding power for fasteners. If an incombustible boardlike product which can be economically manufactured and which is load bearing, with adequate fastener holding power was available for construction purposes a marked advance in the art would ensue. Also, there is a need for a board which can span a greater distance than the usual 16 or 24 inches limitation of plywood, such for example as one which can span a distance of 48 inches or more and still be sufficiently load bearing. Such a unit increases the number of construction systems for which a board can be used and enables certain types of novel construction systems to be followed heretofor unknown to the art.

The improved load bearing construction unit forming the subject of this invention is best accomplished by a novel combination of compressional and tensile members in which the compressional strength is obtained by the use of a cementitious material such as set calcined gypsum, Portland cement or mixtures thereof, which also forms the main body or core of the board. The tensile member, preferably, should be made from metal such for example as steel sheets or wires through glass fibers reinforced plastic can also be used. In order to effectively serve as a fastener holding means for nails or screws, especially for the self tapping screws such as used in attaching gypsum wall boards to sheet metal supports, the tensile member should extend over the entire area of the board. It may also be enclosed within the core to prevent rusting and for fire protection.

It is therefore an object of this invention to provide a load bearing construction unit which is not only substantially unconbustible but also of uniform composition over most of its area.

It is also an object of this invention to provide a load bearing structural board or unit using a noval combination of compressional and tensile members.

It is an added oject of this invention to provide a suitable joint between the tensile and compressional members of a construction unit for the transmission of the ordinary structural stresses therebetween without failure.

It is likewise an object of this invention to provide means to securely hold fasteners in a cementitious board or unit.

It is a further object of this invention to provide tensile members of various configurations so as to accomplish the objects of this invention.

It is a still futher object of this invention to provide a cementitious type of load bearing board with a sheet metal type reinforcing member.

It is an object of this invention to provide construction systems in which the load bearing metal reinforced cementitious board or unit forming the subject of this invention can be used in wall, floor and roof construction.

It is an additional object of this invention to provide means for manufacturing the various types of load bearing structural units forming the subject of this invention.

Various other objects will readily occure to those skilled in the art in which this invention is a part.

This invention is best understood by means of drawings in which:

FIGS. 1, 2, 3, 4, 5 and 6 illustrate various means for effecting a stress resistant bonding joint between a sheet metal type tensile member and the compression member using various shapes of struckout, drawn or stabbed projections extending from the sheet metal and integral therewith, FIGS. 7 and 8 illustrate the use of various types of nails for obtaining the stress resistant bonding joint, FIG. 9 illustrates means by which an adhesive can be used to effect the stress resistant bonding joint, FIG. 10 depicts a board or unit illustrating an embodiment of the invention, FIG. 11 sets forth another embodiment of this invention, FIG. 12 shows another example of this invention, FIG. 13 sets forth a further example of a product within the scope of this invention.

FIG. 14 illustrates means for manufacturing various products forming a subject of this invention, FIG. 15 likewise illustrates an apparatus for manufacturing a product also within the ambit of this invention such as shown in FIG. 13, FIG. 16 illustrates the use of the units in floor, ceiling and partition constructions while, FIG. 17 depicts their use both in the erection and formation of a load bearing wall.

The load bearing cementitious board or unit forming the objects of this invention is best provided by the use of a tensile member formed from sheet metal i.e. sheet steel, which is preferably for good fastener holding properties uniformally distributed over substantially the entire surface of the board and positioned a sufficient distance from the neutral axis so as also to provide good tensile strength thus enabling the unit to withstand the desired load when integrally joined by a structural stress resistant bonding joint to a cementitious core or matrix. While it is preferred to use sheet steel as the tensile member, stainless steel or other metal alloys, aluminum as well as other metals may also be used especially when their higher costs can be justified. Preferably the core or compressional portion should be a cementitious material such as set Portland cement, for example the fast setting type known as "Jet Set" or "Regulated Set", set calcined gypsum or a set mixture of Portland cement and calcined gypsum.

While the primary objective is to provide load bearing boards or units as referred to above, it is an essential embodiment of the invention to effect a suitable structural stress resistant bonding joint between the tensile and compressional members for an adequate transmission of stresses therebetween and thereby enable the board to withstand normal loads when placed such a manner that the metal removed to form the holes is bent into projections extending from the surface into the core.

TABLE 1

| Board No. | No. Rows | Stabbed Holes Holes Per R | Stabbed Holes Size In 1/64" | STABBED HOLES Thick. in 1/32" Overall | STABBED HOLES Thick. in 1/32" Below Steel | Force to Break Lbs. | Remarks |
|---|---|---|---|---|---|---|---|
| 1 | 10 | 5 D | 8 | 15 | 0 | — | Strength too low. Broke setting up. |
| 2 | 10 | 5 U | 8 | 15 | 0 | 136 | |
| 3 | 28 | 7 U | 4 | 16 | 0 | 156 | |
| 4 | 28 | 4 U 3 D | 4 | 20 | 2 | 132 | |
| 5 | 43 | 11 D | 4 | 17 | 4 | — | Same as No. 1 |
| 6 | 15 | 4 U | 7 | 16 | 0 | 209 | Also adhesive plus granules |
| 7 | 29 | 7 U | 7 | 14 | 0 | 92 | Aluminum, about .25 lbs/sq.ft. |
| 8 | 29 | 7 U | 7 | 20 | 0 | 219 | |
| 9 | 29 | 7 U | 7 | 14 | 0 | 253 | 26 gauge sheet steel |
| 10* Upper | 15 | 4 I* 3 O | 7 7 | 16 | 2 | 144 | Upper and lower layers of 32 gauge (.010") steel sheets) |
|  | 14 | 3 I* 4 O | 7 7 |  |  |  |  |
| Lower | 15 | 4 I* 3 O | 7 7 |  | 2 |  |  |
|  | 14 | 3 I* 4 O | 7 7 |  |  |  |  |
| 11 | 14 | 3 U | 8×24 | 22 | 0 | 185 | Holes alt. Rt.Angle & parallel to length, 100% plaster |
| 12 | 14 | 4 U | 8×24 | 21 | 0 | 193 | Same only 20% P.C.& 80% calcined gypsum. |
| 13 | 14 | 8 U | 8×8 | 20 | 0 | 220 | Square holes. |
| 14 | 28 | 4 U | 8×8 | 19 | 0 | 243 | Same |
| 15 | 22 | 6 U | 8×8 | 19 | 0 | 225 | Same |
| 16 | Exp. metal, opening interval .2" acros & .6" length; bond width .1" |  |  | 44 | 4 | 693 | Weight equivalent to 28 gauge sheet metal. |
| 17 | 35 | 6 U | 8×8 | 44 | 4 | 689 | 28 gauge sheet metal; square holes |

*Two layers of .010" sheet steel used with the core inbetween; a thin layer of the core material covers each steel sheet. "I" means projections extend inwardly; "U" outwardly from the core.

in a structurally stressed position. It is also a desirable embodiment of this invention to provide a cementitious type unit which will effectively hold fastners at substantially any location over the area of the board for attaching items thereto, for securing the board to a support or to join two boards together.

Unless otherwise stated in the forthcoming description of the various embodiments of this invention the tensile member is a 0.010 inch thick, cold rolled, ¼ hard, steel sheet and the boards are substantially 2⅞ inches wide by 11 inches long, cured as indicated and tested, center loaded, at a span of 9 inches. All results are in pounds to break the specimens. Unless specifically mentioned the composition of the compression or core portion consists of equal parts by weight of calcined gypsum, i.e. U.S. Gypsum Co. No. 1 Moulding plaster, and regular Portland cement dry mixed together and gauged with a suitable amount of water to give a good pouring consistency.

The forthcoming description of this invention is divided into the various means of obtaining the aforementioned stress resistant bond such as by means of struckout projections, nail-like members, adhesives as well as different shapes or cross sections of the sheet metal.

STRUCKOUT PROJECTIONS

In Table 1 there is shown the effect upon the breaking strength of boards made from a variation in the size and shape of holes stabbed through the sheet steel in The core of boards 16 and 17 were made from 5 parts of high early strength Portland cement and 12 parts by volume of fine size Materialite which is about a 60 lb. per cu. ft. light weight aggregate sold by Material Service Co. Chicago, Ill.

In the above, "U" indicates that the projections extend upwardly into the main body of the board and "D" downwardly and away from the core. All boards were cured surrounded with plastic without any loss in weight and dried to constant weight, usually in about 3 days. It was found from other boards not included in the Table that there was some reduction in strength when the boards were cured for only 9 hours and dried to constant weight in about 12 hours. In one test the strength was reduced by about 20%. In production it may be desirable to use a shorter cure and make up for the loss in strength in other ways such as by use of thicker sheet metal or additional thickness. Retarder was used to increase the setting time for a number of the boards until it was learned that although the set started in about 4 minutes for the 50% each of calcined gypsum and Portland cement there was still sufficient time to mold the board. The strength appears to be about the same regardless of whether the elongated holes are parallel or at right angles to the length of the board so only two board numbers 11 and 12 are shown in which the holes are alternately parallel and at right angles to the length. None of the boards are covered with paper. Note for best results the projections are positioned so that most of them extend upwardly into the main portion of the core and the sheet metal form the bottom surface. Square holes appear to be better than the round.

In the following Table 2 there is shown the effect upon the strength of a variation in three different hole diameters stabbed through the sheet metal for a total circumference of 40, 70 and 100 inches and a board size of 2⅞×11 inches.

TABLE 2

STABBED HOLES OF VARIOUS SIZES AND TOTAL CIRCUMFERENCES.

| Board No. | Total Circum. of Holes Inches | Total No. of Holes | Diam. of Holes In 1/64 | No. of Rows | Holes per Row | Force to Break Lbs. |
|---|---|---|---|---|---|---|
| 1 | 40 | 200 | 4 | 25 | 8 | 76 |
| 2 | 40 | 116 | 7 | 29 | 4 | 180 |
| 3 | 40 | 76 | 11 | 19 | 4 | 204 |
| 4 | 70 | 36 | 4 | 36 | 10 | 233 |
| 5 | 70 | 203 | 7 | 29 | 7 | 201 |
| 6 | 70 | 130 | 11 | 26 | 5 | 231 |
| 7 | 100 | 506 | 4 | 46 | 11 | 209 |
| 8 | 100 | 288 | 7 | 36 | 8 | 264 |
| 9 | 100 | 186 | 11 | 31 | 6 | 237 |

All of the boards in Table 2 were made as uniform as possible. All were made ½ inch in thickness and the 0.010 ince steel sheet formed the bottom surface with the projections upward. The wet boards were wrappted in plastic for 3 days without and loss in moisture. They were then dried to constant weight at about 145° F. within 3 days. For a total circumference of only 40 inches the projections from the larger size holes appeared to have greater strength; however, with the 70 and 100 inches circumferences there appeared to be little difference in the strength due to a variation in the hole sizes.

While best results are obtained when the sheet metal forms the bottom surface and the prongs extend upwardly it may be necessary to apply a thin protective layer over the bottom surface to protect the metal from fire and rusting. In such case some of th prongs may project downwardly into this layer to hold it in place though a layer of paper adhered over the lower exposed surface of the layer may suffice in retaining this thin layer intact as there is some keying through the holes even when all the prongs extend in the opposite direction. Short lengths of glass fiber distributed throughout this layer as well as in the main body of the board adds desirable properties especially under exposure to a high temperature. Board No. 9 made from a heavier gauge sheet steel was stronger than comparable boards from the .010 inch sheet steel and much stronger than that made fom aluminum, board No. 7. This difference is probably due to greater strength in the prongs rather than in the sheet metal for there were very few failures in tension of the sheet steel even when weakened by a large number of holes per inch of width. As would be expected the thicker the board the greater the strength. Obviously, a still greater thickness than the 44/32 inch boards, i.e. boards 16 and 17 Table 1, will result in still greater strength.

A board similar to that shown in FIG. 10 was made 12 inches wide and 52 inches long using a 28 gauge galvanized sheel sheet as the lower surface and for shiplap type edges and the core was 1½ inches thick and formed from a set mixture similar to that used in making boards 16 and 17. The mixture consisted of 12 parts of fine grade Materialite and 5 parts by volume of high early strength Portland cement. The bond was obtained with the same type of square stabbed holes as in board No. 17 using projections extending into the core from 143 rows of 27 holes between 1/8 and 5/32 inch square. This board when supported 47 inches apart and loaded at the third points, i.e. two top bearing points each 16 inches from a support, withstood a calculated uniform load of 145 lbs. per square foot before reaching a L/360 deflection.

While projections from round holes as shown in FIG. 1 are used in most of the above examples it is preferred and even desirable to use the projection 2 from square holes as in FIG. 2 or projections 3 and 4 from elongated holes as in FIGS. 3 and 4. In each of the FIGS. 5 is the sheet metal and 6 the core into which the projections are embedded though in the Figures, a portion of the core has been removed to illustrate the configuration of the various types of projections.

FIG. 5 shows anothr modification which will give a stress resistant bond. In the FIG. 5 is the sheet metal and 7 a struckout and drawn projection extending above the surface of the sheet metal which will give a stress resistant bond when a series of them are embedded into a cementitious core. They also assure a surface for engaging self tapping fasteners.

In FIG. 6 there is shown a further modification in which rows of short lengths of serrated flanges 8 and 9 are struckout from the sheet metal leaving elongated holes 10. The short lengths of serrated flanges are spaced a short distance apart along the length of the board so as to provide narrow cross members 11 which are needed not only to hold the sheet together but also to transmit the load laterally. Note that the teeth 12 of flange 8 are the grooves 13 of flange 9 and vice versa so that there is no waste of metal. In row 17 there are shown lines along which the sheet metal is sheared to give the teeth shown in rows 8 and 9. The sheared metal is bent upwardly to form the flanges for embedding into the core. The width of the slotted holes 10 must be less than the diameter of the shank of the fasteners for good uniform holding power.

NAILS AS BONDING AIDS

Nails, brads or other types of fasteners having shanks extending from and through the sheet metal layer upwardly into the core as shown in FIGS. 7 and 8 have been found to give good bond and resistance to stress. The heads 14 either engage the lower surface of the sheet metal as in FIG. 7 or extend below as in FIG. 8 so as to be embedded into a layer of a protective cementitious material 20. In these FIGS. 15 and 16 are the shanks of the nails while 5 is the sheet metal and 6 the core material. In FIG. 8 a special upholsters nail is shown in which the shank portion next to the head is of lesser diameter which enables the head to drop down a short distance after being driven through the sheet metal.

In Table 3 below, the boards have the regular 2⅞inches x 11 inches, .010 inch, ¼ hard cold rolled steel sheets as the tensile member as in Tables 1 and 2 with the core made from equal parts of calcined gypsum and Portland cement by weight. The boards were wrapped while wet in plastic for 3 days and dried to constant weight in 3 days. As in the above Tables the force to break was that needed for a 9 inches span, center loaded.

TABLE No. 3

NAILS AS BONDING AIDS

| Board No. | Type of Nails | No. of Rows | Nails per Row | Thickness Overall | Inches Below Steel | Force to Break Lbs. |
|---|---|---|---|---|---|---|
| 1 | 1/2" Brads | 20 | 5 | 1/2 | 0 | 294 |
| 2 | 1" Roofing | 11 | 3 | 1/2 | 1/8* | 220 |
| 3 | Same | 8 | 2 | 1/2* | 1/8* | 160 |
| 4 | 11/16"Lathing | 6 | 2 | 23/32 | 0 | 192 |
| 5 | Upholsters 7/8" | 6 | 2 | 3/4 | 3/16* | 180 |
| 6 | Same | 8 | 2 | 1/2 | 1/8* | 180 |

*Heads of nails extend into the portion of the core below the steel.

Most of the boards, particularly No. 1, broke along the lines of the nails. The upholsters nails made by the Atlas Tack Corp., cut to the thickness of the board, were used in boards No. 5 and 6, see FIG. 8. The roofing nails used for board No. 2 were also cut to correspond to the board thickness. Board No. 4 is depicted in FIG. No. 7.

ADHESIVES AS BONDING AIDS

Very excellent results were obtained with the use of certain adhesives as the bonding aid, especially when ceramic granules were embedded into the adhesive layer before it has hardened and with a portion of the granules extending thereabove, see FIG. 9. In the FIG. 5 is the sheet metal, 18 the adhesive layer, 19 the layer of granules and 6 the cementitious core. Best results were obtained when the cementitious core was applied over the adhesive before it had set as shown in the following Table 4.

TABLE 4

ADHESIVES AS BONDING AIDS

| Board No. | Type | Adhesives Lbs./Ft.$^2$ | Cond. at Pour.Bd. | Granules Lbs./Ft$^2$ | Thick. In. | Lbs. to Break |
|---|---|---|---|---|---|---|
| 1 | Epoxy* | .193 | Plastic | 0 | 1/2 | 160 |
| 2 | Same | Similar to above only granules on exposed hardened surface. | | | 1/2 | 253 |
| 3 | Polysulfide** | .086 | Spreadable | 0 | 1/2 | 249 |
| 4 | Same | .082 | Tacky | .193 | 1/2 | 275 |
| 5 | Same | .095 | Hard | 0 | 1/2 | Very low |
| 6 | Same | .091 | Hard | .208 | 1/2 | 261 |

*An epoxy type adhesive known as Builder's Adhesive and made by Wilhold Glues, Inc., mixed at the ratio of one oz. by volume of the liquid to one oz. by weight of the powder.
**A mixture of equal parts of portions A and B by weight of a polysulfide epoxy type adhesive No. T-120-3, lot 6 made by the Thiokol Chemical Co.

The 2⅞ inches x 11 inches x .010 inch, ¼ hard cold rolled steel sheets used to form the boards were heated to a blued condition to remove oil, etc., and cooled before applying the adhesive. The usual 50-50 mix of No. 1 moulding plaster and Portland cement was used. The boards were tested using a 9 inches span and a center load. The granules were obtained by breaking a flower pot and using that portion passing a .10 inch square opening and retained upon an .05 round opening. Glass fibers were added to the core of the No. 1 board. In all the boards the sheet metal was used as the bottom surface. It is quite evident from the above that an adhesive such as the polysulfide epoxy has good bonding properties without granules when the plastic had not hardened. The use of granules adhered to the surface gave good bond even when the adhesive had hardened before forming.

VARIATION IN SURFACE CONTOUR

It is possible and can be considered to be within the ambit of the invention to form the sheet metal into various configurations such as corrugations, i.e. curved, right angular or dove-tailed cross sections, T or with a U contour along with the stabbed holes. These have the disadvantage of requiring an extra forming operation and an increased amount of sheet metal. This must be considered in evaluating any increase in strength which may result. Another alternative is to cut the sheet metal into strips and form into L, T, U or inverted U shapes with serrations or stabbed holes formed therein to give the required bond. However, if fasteners are to be attached to such tensile members the space between the strips must be less than that of the shank of the fastener. Also they should be attached together laterally to give a distribution of the load. This can be obtained by leaving a portion of the sheet metal between the rows, such as 11 in FIG. 6, or cross wires or strips can engage these strips to give a grillage.

Glass fiber can be added to the core material to improve the resistance to fire, cracking, etc. Other materials also may be added to the core to effect certain improvements such as to lower the consistency of the cementitious mix, i.e. gum arabic; decrease the density such as with foaming agents for light weight aggregates or materials to improve the water or wear resistance, particularly the surface.

While a mixture of equal parts by weight of the plaster and Portland cement are used in forming most of the boards described above, it is possible to use 100% calcined gypsum or 100% Portland cement or other comparable cementitious materials. When all calcined gypsum is used there is a tendency for cold flow under load especially when the units are subjected to high humidity or moisture. The strength is also reduced and there is also corrosion. With all Portland cement the early wet strength is markedly lower and hence more difficult to handle after forming though with the new fast setting and high early strength Portland cement developed by the Portland Cement Association referred to as "Jet Set or Controlled Set" gives improved wet strength thus enabling high speed production of units from 100% Portland cement. A mixture of the two gives the advantages of both, see Pat. No. 1,923,370. In preparing the cementitious core composition consideration should be given to its resistance to fasteners extending therethrough for engaging the tensile member. Certain cores such as those containing aggregates like boards No. 16 and 17, Table 1 may resist the passage of certain self tapping screw-type fasteners.

Various types of edges can be formed with the board. While a square edge as shown in FIGS. 11 and 12 is the easiest to form it is advisable for most purposes to use an interlocking edge so as to transmit a portion of the load to an adjacent board. A tongue and groove type edge will serve this purpose such as shown in FIG. 10 though shiplap, V and other type edges may be more desirable for certain purposes.

In FIG. 10 there is shown a typical board or unit made following this invention. In the FIG. 26 is the sheet metal bent to form the tongue 21, the groove 22 and the flat connecting portion 23 thereof. The later has projections 2 from square holes stabbed therein for engaging the core 6. The sheet meal has its raw edges returned to give a more uniform edge 24 and to further strengthen the edge. In order to present a pleasing suface, the connecting portion 23 can be covered with a paper or other membrane 25 and bonded thereto by an adhesive layer 28 such for example as a thin layer of set calcined gypsum, which, while not readily bondable to the sheet steel will bond through the holes left by the projections extending into the core. The top surface 27 may also be treated such as by grinding to give it a smooth surface with or without a decorative effect like terrazzo or it can be merely screeded smooth before setting. Also, a membrane, paper or fabric, can be adhered to this surface, if desired. Such are not shown but can be readily attached during the production of the units by means of an adhesive layer such as referred to above. Stabbed holes may also be formed through the edges to give projections into the core.

The construction unit shown in FIG. 10 can be used for spans up to 48 inches or more; however, for shorter spans a unit similar to those shown in FIGS. 11 and 12 may be preferable. Note that the major difference in the construction shown in FIGS. 11 and 12 is in the manner by which the tensile member is positioned with respect to that of the membrane enclosing one face and the edges and that of the membrane enclosing the other face. In FIG. 11, the tensile member 30 is adjacent the membrane 31 which encloses both a face and the edges while in FIG. 12, the tensile member 38 is adjacent the membrane 32 which encloses a face only and not the edges. In FIG. 11, the edges 33 of the tensile member 30 and that of the membrane 37 terminate under the face 35 of the opposite face; while in FIG. 12 the edges 34 of the membrane 36 are folded over the face 32. In both Figures, the projection prongs 2 from square holes stabbed through the tensile member extend into the core 6 to give the necessary stress resistant bond. Obviously other means of effecting the stress resistant bond may also be used.

Certain membranes such as paper do not bond to a core containing noncalcined gypsum type of cementitious material such as set Portland cement or mixtures thereof with set calcined gypsum. In order to effect such a bond an adhesive material such as set calcined gypsum must be used. Such material is shown in the Figures as the layer 37. The bond is made to the core positioned in the holes and between the prongs.

In FIG. 14 there is shown, schematically, an arrangement of means for the continuous manufacture of boards or units similar to those shown in FIGS. 10, 11 and 12. The machine is somewhat similar to that used for manufacturing gypsum boards which is usually formed upside down, i.e. the surface which is to be exposed and which is integral with the edges is down. The arrangement as shown can be used to make the boards in which the tensile member is applied during manufacture either at or near the bottom as in part C or near the top, part B. The enclosing membrance for the tensile member when positioned at the bottom and also part of the edge is applied by part A and the top membrane by part D.

In making the board shown in FIG. 10 parts A, C, and D are used in the following manner. The bottom paper 41, shown as 25 in FIG. 11, is unwound from the roll 43 and is scored by the device 42 so as to facilitate the folding of the paper to form the edges. Note throughout the description of the machine that the numbers for various portions of the boards will not conform to those in the Figures for the boards so as to emphasize that the machine can be used to make boards other than those shown in the Figures. After the paper or membrane is scored to facilitate folding an aqueous slurry of calcined gypsum 44 from the mixer 45 is deposited upon the paper and spread thereon as a thin layer by the means 46. The paper is guided upon the forming table 47 by the roll 48. The edges are folded by guides 49 and passed between a set of master rolls 50 in a manner well known in the manufacture of gypsum board and need not be described in detail. The sheet metal 57 is removed from the roll 51 and passed through the pair of rotary rolls 52 and 53 which stab holes into the sheet metal such that the projections extend upwardly into the core during formation. These projections can also be stabbed into the metal forming the edges. Roll 52 has pointed pins 58, such for example of square cross sections extending therefrom and the roll 53 has matching recesses into which the projections formed by the pins in the sheet metal as well as the pins extend. Any distortion due to the formation of the projections is removed by the set of rolls 54 positioned in between the row of holes. The edge is then formed into the sheet metal by the rolls 55 and bent upwardly by the guide means 56. The formed sheet metal along with the bottom paper and the adhered plaster mix passes under the mixer 59 where an aqueous cementitious mix is deposited thereon and formed into a core of uniform thickness as the sheet metal along with the bottom membrane and the top membrane 58 pass between the master rolls 50-50. In order to improve the bond of all layers and to insure that the projections extend into the core and the adhesive layer upon the lower membrane will contact the core through the holes, a vibration device 63 is provided. In order to prevent the slurry from spilling out the sides during formation when there is no paper used to form the complete edge as in FIG. 10, decklo strips can be applied along each edge to contain the slurry. A belt 77 may be needed to convey the board from the master rolls.

When there is no top membrane, as in FIG. 10, an endless belt 66 shown in broken lines in portion D contacts the top master roll to assure that the cementitious mix will not stick thereto. This belt can be made from plastic which will not adhere to the cementitious material, especially after it has set, so that it can be removed by the roll 69 and returned by the roll 67. A reciprocating screed may be used instead of the top master roll, though less desireable, if a top paper or other membrane is used such as 35 in FIG. 11 and 32 in FIG. 12 the bond between the paper and the core is obtained by an adhesive such as an aqueous calcined gypsum slurry 61 applied to the inner surface of the membrane 60 being unwound from the roll 62 before it passes under the master roll by the mixer 68. The slurry is spread into a thin layer upon the inner surface by such means as the rolls 64.

The cementitious material sets to form the core and the board is conditioned in the chamber 65 in any manner which is indicated such as partial or complete drying, treatment with added water, coating or grinding the surface, etc. The board need not and should not be completely dried if their is a substantial amount of Portland cement in the core as the board can be dried in transit or upon the job as it is quite strong even when wet if a proper core composition is used. The added time in the moistened state is desirable. Thus a dryer as used in the manufacture of gypsum board is not absolutely necessary.

The conditioned continuous sheet is cut at 70 into the desired lengths. A rotary type saw, not shown, having special teeth or a carborundum cutting surface can be used. Such type of cutoff devices, which travel transversely across the sheet while the sheet is in forward motion, as well as details connected with the mixing of the cementitious material with water and the necessary feeding and other auxillary equipment are well known in the art of manufacturing boardlike products from a cementitious material and need not be described.

With certain modification the same arrangement can be used to make the construction units shown in FIGS. 11 and 12. FIG. 11 is formed by parts A C and D by which the sheet metal 30, which is shown as 57 in the description of the apparatus, is bent upwardly and inwardly by the forming means 55 and 56. Also, in FIG. 11 the bottom paper from part A extends completely around the edges and under the top paper as in gypsum board manufacture. This contains the aqueous slurry within the master roll area. The top membrane 35 is applied from portion D as described above.

FIG. 12 is formed by means of the portions A, B and D of FIG. 14. The board is formed upside down from that shown in FIG. 12. The sheet metal shown as 70 in portion B in FIG. 14 is unwound from the roll 71 and is fed by the feed roll 72 into the reciprocating multiple stabbing points 73 which forces the projection into the opening 74 and then through the rolls 75 which straightens out distortions made by the punching operation. This stabbing operation could be carried out by other means. The rolls 75 are similar to rolls 54 in portion C. In both, on the projection side the rolls consists of a series of rotating disks positioned between the various rows of projections to straighten any distortions arising out of the stabbing operation. The straightened sheet metal with the projection downward is fed into the cementitious slurry 76 from the mixer 59 and between but adjacent the top master rolls 50. The top paper 60 shown as 32 in FIG. 12, with the calcined gypsum bonding aid upon the inside surface is fed by the top master roll over the top of the slurry to form one face of the board. The bottom paper is simultaneously fed between the master rolls in the manner described for FIG. 10 with the exception that the paper along the edges extend upwardly beside the top master roll and is folded over the top paper after formation by guides not shown, an operation well known to those skilled in the manufacture of gypsum board. The paper is previously scored to aid in the folding operation. If no paper is used on the exposed surface it can be ground to give a smooth surface as well as a uniform thickness for use in specific purposes such as an underlayment. Also, by incorporating colored aggregates the ground surface can give the appearance of terrazzo. It should be pointed out that when there is no paper upon the compressional face and no edge reinforcement there is a tendency for this surface to crack when convexly flexed; in which case, glass fibers or other types of tensile reinforcing material should be added to the core at least adjacent to such surface.

While the introduction of a layer of set calcined gypsum between a membrane and a cementitious core to effect a bond of the membrance to such a core is an important part of the disclosure of the overall invention, it is not the intention to limit the disclosure to the use of an aqueous slurry of the calcined gypsum added to the inner surface of the membrane before it reaches the forming means, such as the master roll, as setforth in the above description of FIG. 14 but to include adding the slurry to the paper surface prior to its application to the board machine and drying the layer and rewinding the membrane such as paper for subsequent use on the machine. The bond to the core for such treated membrane is further aided by a recalcination of the set calcined gypsum layer to a state which will permit rehydration when placed in contact with water such as in the core mix. In such case a lower consistency plaster such as alpha gypsum obtained by calcination in an aqueous medium, i.e. Hydorcal, will be better suited for the purpose as a set plaster which has been recalcined and rehydrated gives a weaker cast. A stronger original plaster will obviously result in a strong rehydrated cast. The calcined gypsum can also be added unhydrated along with a nonhydrating adhesive such as used in certain orthopedic plasters, see patent number 1,726,403. In any case the addition of the usual farinaceous bond aiding material such as acid treated wheat or corn flour, sometimes referred to as K-B paste, would be of value. By adding the calcined gypsum to the paper other than at the forming machine, the operation of the equipment is greatly simplified. Also, when the aqueous calcined gypsum slurry is applied during formation the spreading is aided by retarding the setting time of the slurry at the machine thus simplifying this operation as a fast set is much more difficult to spread owing to the tendency for the plaster to set upon the equipment. This retarded layer can be used when the core material has a fast set as the accelerating action is transmitted to the retarded layer, especially if the latter is quite thin, i.e. only enough being used to aid in the bond. Also set accerlerating material can be added to the surface of the membrane next to the calcined gypsum layer to decrease the setting time.

While the projections formed from the stabbed holes are used to effect a bond in the above examples it is not the intention to limit the scope of the invention thereto for other types of projections such as struckout and drawn portions like 7 in FIG. 5 can be used and are preferred for certain purposes. Such projections have the added advantage that the sheet metal is continuous as the offset or struckout portion extends over the hole to engage the fasteners; the length of the holes can be either parallel or transverse to the length of the board.

The size and numbers of holes are governed by several factors. If one of the purposes is good fastener holding properties then the hole size must be less than the shank of the diameter of the fastener. For the usual wallboard fasteners the holes should not be larger than about 5/32 inch either square, circular or slots. The spacing of the holes is also determined by the minimum distance the stabbing tool can be spaced when a series of them are used. A spacing of between ¼ to 3/8 inch in the lengthwise rows with about a 5/16 inch distance between the rows will give a good bond with the square or round holes; the size and number of holes also determine the strength, see Tables 1 and 2. The strength values given in all the tables are to illustrate the strength relationship of the various means of effecting the bond and are not to be used for design purposes as such should be obtained from tests made of the actual commercially produced units.

The strength is also a function of the thickness of the board as well as the distance the tensile member is positioned from the neutral axis. If the wheet metal, for example, is used as a lower surface the strength will obviously be greater for the same thickness of board than if a layer of cementitious material and paper are positioned therebelow. However, boards such as shown in FIGS. 11 and 12, about 3/4 inch thick, and using the .010 inch, ¼ hard cold roll steel and the above hole spacing will be found to safely support a uniform load of 60 lbs. per sq. ft. when the boards are supported by wooden joist spaced 16 inches on centers preferably with edge joints which will transmit a portion of the load to the adjacent board or one which is reinforced at the edges by an upturned portion of the sheet metal. Obviously thicker boards, heavier steel and greater bonding strength will markedly increase the load bearing capacity thus permitting a greater spacing between the supports. Thickness as much as 2 inches or more can be used. With the greater thickness a tongue and groove type joint similar to that used on gysum planks or as shown in FIG. 10 will give distribution of the load between adjoining units.

While projections of various types are used as examples of stress resistance bonding means in the description of the apparatus shown in FIG. 14 obviously various other means for accomplishing a suitable bond may be used such for example the use of nails which can be applied by a nailing machine, see Table 3. Also a very good bond can be obtained by the use of an adhesive such as polysulfide epoxy such as sold by the Thiokol Chemical Co. No. T-120-3, Lot 6, expecially when the bond is aided by granules embedded into the adhesive see Table 4. Also, the sheet metal can be formed into various surface contours as described above under a similar heading.

It is also an embodiment of this invention to first prepare a cementitious board 78 see FIG. 13, such as by the usual gypsum board process and then attach the sheet metal tensile member 83 thereto by stabbing holes in the sheet metal so that prongs 84 extend through the paper into the core 80. The holes formed by the stabbing operation are grouted with a cementitious material, not shown, such as set calcined gypsum usually from the layer 86 used to effect a bond of the membrane 87 to the sheet metal. It is possible and desirable to have the core next to the paper 82 and the sheet metal more porous to aid in the pentration of the prongs when such are used with the remaining portion denser for greater compressional strength. Two edge embodiments are shown in FIG. 13, a square edge 88 on the left and a slanted edge 89 on the right. The latter is divergent in the direction of the ultimately exposed surface membrane 81 so that the edge of this membrane will contact the edge of that of the adjacent unit or board, while in edge 88 the sheet metal and the added surface membrane along with the adhesive layer intervenes at the joint. The slant provides for a return of both the sheet metal and the surface membrane along the edge and still enables the desired edge contact to take place. Note that the surface membrane 81 also extends around the edges and under 82 which is the back paper of the gypsum board. Also, it is not necessary to cover the surface of the sheet metal with the membrane 87 though it is desirable to fill the stabbed holes with some type of cementitious material to aid in holding the sheet metal in place or otherwise adhere it to the board.

FIG. 15 shows schematically, a means for preparing the board shown in FIG. 13. In FIG. 15 a plurality of board 78, which may have been previously made elsewhere, such as upon a gypsum board machine, are used. These have a core which is enclosed with two separate sheets of paper as shown in FIG. 14. The boards while being carried forward in a copanar and end to end relationship are covered with a layer of sheet metal 83 from the roll 90 applied to their back surfaces by the roll 91 and adhered to the boards by prongs from holes stabbed into the sheet metal by such means as 92 so that they pass through the paper or membrane 82 into the core 80 as shown in FIG. 13. The sheet metal is bent down along the edges by the roll 93. The holes are filled by a cementitious material 86 from the mixer 95; the mix is spread into a thin layer by the roll 94 while simultaneously applying the paper 87 from the roll 99. The paper is formed along the edges by the guides 96, the paper being previously scored. A vibrating device 97 is positioned under the board to aid in filling the holes with the cementitious material. The sheet metal and paper 87 are cut at the joint between the boards by the device 98. While the stabbed and punched out types of stressed resistant bonding means are preferred a suitable bond may also be accomplished by the use of nails, brads, adhesives, etc. as setforth in FIG. 7, 8 and 9. A nailing machine may be used to drive the nails through the sheet metal into the core replacing the stabbing device. An adhesive applicator can be used to apply an adhesive.

As mentioned earlier, other materials can be used as the tensile member such for example as aluminum, stainless steel and other metal alloy. They also can be expanded, struckout or otherwise conditioned to provide a bond to the core. In addition the steel can be covered with a vitrous enamel such as that made by the Mirawal Company especially when an adhesive is used as a bonding aid, through vitrous enamelled sheets may also have prongs formed from stabbed holes to effect a bond. In the latter case the steel should be coated with the vitrous material after the holes have been stabbed. The smooth vitrous enamel can serve as a decorative surface. The steel can be plated, galvanized or otherwise surface treated to give rust resistance.

It is within the scope of this invention to form the tensile material with the bond engaging projections by casting from metal or from glass fiber or other reinforced plastic; or to use wires preferably of rectangular cross section, and weave or weld the wires together such that the wires are on edge thus exposing the greatest surface to resist movement under stress and hence a stronger bond. The wires can be narrow strips of steel placed on edge with cross members threaded therethrough to aid in distributing the load laterally and to aid in the bond as well as to hold the strips in the proper position. The spacing of the strips should be such as to engage the shanks of fasteners.

The construction units made following this invention have a wide range of uses in building construction such as for floors, ceilings, walls, partitions, wall surfaceforms for poured concrete construction, curtain walls as well as many other applications which will readily occur to those skilled in the art of which this invention is a part. FIG. 16 illustrates an example of their use in floor, partition and ceiling construction. In the FIG. 100 is an open web steel joist having attached to its top chord 130 the wooden nailer 101 to which are secured the construction unit 102 for the floor by means of the screw 103. Note that the tensile portion 110 of the unit is downward to obtain maximum strength. The top of floor surface can be either a membrane or the exposed cementitious core as shown. A floor surfacing can be applied thereto if desired. The unit 104 are shown attached to the bottom chord 85 to form the ceiling by a combination of the clip 105 and the fastener 106 along with the shiplap edge 107 in the following manner. The clip 105 is attached to the sheet metal surface 129 of the unit near the shoulder edge by the screw 106 and when the unit is applied to the ceiling and secured to the angle 108 by turning the lip so that it rests thereon, as shown, the screw 106 can either be tightened or the lip 108 can be curved to give tightening by a caming action when turned. The top lip edge portion of the next unit is inserted over the attached shoulder and the opposite edge of the unit secured to the bottom chord in the same manner as described above. It is possible to attach sheet metal splines across the bottom chord and to screw attach the units to the spline in the same manner as shown in FIG. 17 in which units are attached to sheet metal studs. In this method of attachment, sheet metal reinforcing member 129 in the unit can be positioned downwardly instead of upwardly as shown in FIG. 16. The method of attaching the ceiling units shown in FIG. 16 can be used with the tensile member dowardly by attaching the clip 105 with screw fasteners extending through the sheet metal near the exposed surface preferably with the heads of the fasteners exposed and the shanks extending through the unit and the clip attached by means of a nut.

It is possible to secure greater strength by positioning the sheet metal tensile member adjacent both faces thus obtaining concealed attachment to the inner sheet metal layer as in FIG. 16 and tensile strength by means of the outer or lower layer thus enabling longer spans between supports for the ceiling unit. In order to effect a concealed attachment of the floor units 102 they to can be attached by means of lugs similar to that used for attaching the ceiling units.

FIG. 16 also depicts a wall construction in which the units forming the subject of this invention can be used. In the FIGURE, a wooden runner 112 is shown attached to the floor units 102 by a series of screws such as 111. A plurality of units 109 are placed upon the runner in coplaner relationship with the outside surface flush with that of the wooden runner and attached thereto by the toenails 113. A series of additional boardlike members 114 such as similar units or wall boards such as gypsum boards are attached thereto by means of self-tapping screws 115 which extend through the board and engage the sheetlike tensile member of 109. The wall is secured to the ceiling by the leg 125 of the angle ceiling runner 126 which is attached to the ceiling unit 128 by the screws 127. Obviously other types of runners and attachments can be used. The various layers of units or wall boards can be attached together by means of adhesives. Units made following this invention are ideal for partitions in which cleats, fixtures, etc., are to be attached thereto as the tensile member has good fastener holding power.

FIG. 17 illustrates a unique application of the construction units for a load bearing wall in which the units serve not only as a form for a poured concrete wall but also function as a surface material. Hence, there is no need to use temporary forms as the units remain in place. The surface can either be left exposed or covered in any suitable manner. The moisture remaining in the wall can be slowly dissipated through holes in the tensile member. In FIG. 17 124 are the construction units applied with the tensile portion 116 positioned outwardly and attached to the metal studs 117 by means of self-tapping screws 118. These screws extend through the sheet metal layer and the core 119 into legs 120 of the channel shapped metal stud 117. The core of the unit must be such as to permit the passing of the screw therethrough. A set mixture of calcined gypsum and Portland cement will enable such to take place. The exposed surface of the units are shown covered with a membrane. The series of studs, placed in line, have openings 122 and 123 in the web portion to provide a monolithic relationship of the poured concrete 121 upon both sides thereof. The stud can also serve as a reinforcing member though additional reinforcement can be added. Note that reinforcing rods, pipes and conduits can extend horizontally through the studs either along the sides through openings 122 or the center openings 123. In order not to place too great a strain upon the construction units the height of the wall can be poured in increments.

When used as curtain walls the units can be attached to vertical supports by screws in the manner shown in FIG. 17 or by the use of the lugs as shown in FIG. 16 or by other means well known by the construction art.

Because of the excessive weight of the boards used in a load bearing capacity they should be made of a lesser dimension than that ordinarily used for wall construction so as to facilitate handling. A 16 inch or 24 inch by 96 inch are practical dimensions. Where expedient units can be applied with their lengths parallel to the supports as well as right angles thereto.

While various embodiments have been setforth of means for carrying out this invention it is not the intention to limit the scope thereto but only by the forthcoming claims.

I claim:
1. A load-bearing structural unit comprising a hardened cementitious body portion of high compressional strength and a substantially continuous sheetlike tensile member integral with and contiguous to said body portion extending substantially over the entire area of said body portion and disposed at a substantial distance beyond a substantially centrally located plane of said unit and a structural stress resistant bonding joint between said tensile member and said body portion, said bonding joint comprising a plurality of closely spaced portions of said tensile member embedded and extended into said body portion in the direction of said substantially centrally located plane, said portions of said tensile member embedded into said body portion comprising prongs integral with and at substantially right angles to said sheetlike tensile member and extending from the periphery of holes in said tensile member and the total area of said prongs is at least about 2% of the total area of said tensile member, substantially each of said holes are positioned in a row, along with other holes, parallel to the length of said unit and in another row at right angles to said length, all rows are positioned in a right angularly disposed reticulated cross hatch relationship, whereby the holes at the intersection of any pair of adjacent and parallel rows of holes lengthwise and crosswise of said tensile member are in a boxlike configuration, and continuous strips of nonperforated portions of said sheetlike tensile member extending between the said rows of said holes parallel and at right angles to said length.

2. The load-bearing structural unit claimed in Claim 1 in which said tensile member comprises sheet metal.

3. The load-bearing structural unit claimed in Claim 1 in which at least one of the terminating elongated edge portions of said tensile member is angularly disposed with respect to a face of said unit.

4. The load-bearing structural unit claimed in Claim 1, comprising a protective layer of a cementitious material positioned between said tensile member and the adjacent exposed surface of said unit, said exposed layer comprising a sheetlike membrane and a bond between said cementitious material and said sheetlike membrane.

5. The load-bearing structural unit claimed in Claim 1 in which said hardened cementitious body portion is a gypsum board and said tensile member is a sheet metal extending over a surface of said gypsum board.

6. A construction system comprising a load-bearing structural unit comprising a hardened cementitious body portion of high compressional strength and a substantially continuous sheetlike tensile member integral with and contiguous to said body portion extending substantially over the entire area of said body portion and disposed at a substantial distance beyond a substantially centrally located plane of said unit and a structural stress resistant bonding joint between said tensile member and said body portion, said bonding joint comprising a plurality of closely spaced portions of said tensile member embedded and extended into said body portion in the direction of said substantially centrally located plane, said portions of said tensile member embedded into said body portion comprising prongs integral with and at substantially right angles to said sheetlike tensile member and extending from the periphery of holes in said tensile member and the total area of said prongs is at least about 2% of the total area of said tensile member, substantially each of said holes are positioned in a row, along with other holes, parallel to the length of said unit and in another row at right angles to said length, all rows are positioned in a right angularly disposed reticulated cross hatch relationship, whereby the holes at the intersection of any pair of adjacent and parallel rows of holes lengthwise and crosswise of said tensile member are in a boxlike confiferation, and continuous strips of nonperforated portions of said sheetlike tensile member extending between the said rows of said holes parallel and at right angles to said length and the shank portion of a fastener extending first through said cementitious body portion and engaging said tensile member.

7. The construction system claimed in Claim 6 in which said tensile member comprises a sheet metal and said shank portion engages one of said holes and at least one dimension of said hole is less than that of the diameter of said shank portion prior to the insertion of said shank.

8. A load-bearing structural unit comprising a hardened cementitious body portion of high compressional strength and a substantially continuous sheetlike tensile member integral with and contiguous to said body portion extending substantially over the entire area of said body portion and disposed at a substantial distance beyond a substantially centrally located plane of said unit and a structural stress resistant bonding joint between said tensile member and said body portion, said bonding joint comprising a plurality of closely spaced portions of said tensile member embedded and extended into said body portion in the direction of said substantially centrally located plane, said portions of said tensile member embedded into said body portion comprising prongs integral with and at substantially right angles to said sheetlike tensile member and extending from the periphery of holes in said tensile member; the total area of the prongs extending around the periphery of a hole is the same as the total area of the hole; the total area of said prongs is at least about 2% of the total area of the tensile member and substantially each of said holes are position in a row, along with other holes, parallel to the length of said unit and in another row at right angles to said length, all rows are positioned in a right angularly disposed reticulated cross hatch relationship, Whereby the holes at the intersection of any pair of adjacet and parallel rows of holes lengthwise and crosswise of said tensile member are in a boxlike configuration, and continuous strips of nonperforated portions of said sheetlike tensile member extending between the said rows of holes parallel and at right angles to said length.

9. The load-bearing structural unit claimed in Claim 8 in which said hardened cementitious body portion is a gypsum-type board and said tensile member is a sheet metal extending over a surface of said gypsum-type board.

* * * * *